United States Patent [19]

VanAssche

[11] Patent Number: 5,301,451
[45] Date of Patent: Apr. 12, 1994

[54] FLAT LINE BOOM

[76] Inventor: Charles R. VanAssche, 1102 Mitchell Ave. #303, Port St. Lucie, Fla. 34952

[21] Appl. No.: 142,601

[22] Filed: Oct. 25, 1993

[51] Int. Cl.$^5$ .................. A01K 91/00; A01K 97/10
[52] U.S. Cl. ........................................ 43/27.4; 43/21.2
[58] Field of Search ............. 43/27.4, 21.2, 15, 16, 43/8; 114/364, 255

[56] References Cited

U.S. PATENT DOCUMENTS

| 3,484,978 | 12/1969 | Nakashima | 43/17 |
|---|---|---|---|
| 3,665,633 | 5/1972 | Scott | 43/19.2 |
| 3,745,690 | 7/1973 | Lewis | 43/21.2 |
| 3,964,706 | 6/1976 | Adams | 43/21.2 |
| 3,975,854 | 8/1976 | Graham | 43/6.5 |
| 4,388,774 | 6/1983 | Thoemke | 43/21.2 |
| 4,407,089 | 10/1983 | Miller | 43/21.2 |
| 4,468,878 | 9/1983 | Maer | 43/21.2 |
| 4,485,579 | 12/1984 | Hawie | 43/21.2 |
| 4,716,674 | 1/1988 | Kammeraad | 43/27.4 |
| 4,753,029 | 6/1988 | Shaw et al. | 43/21.2 |
| 4,836,127 | 6/1989 | Wille | 114/343 |
| 4,876,980 | 10/1989 | Bell, III | 114/364 |
| 4,993,346 | 2/1991 | Rupp | 114/255 |
| 5,140,928 | 8/1992 | Frick | 114/255 |
| 5,191,852 | 3/1932 | Rupp | 114/255 |

Primary Examiner—P. Austin Bradley
Assistant Examiner—Jeanne M. Elpel
Attorney, Agent, or Firm—Brooks & Kushman

[57] ABSTRACT

A flat line boom apparatus holds a fishing rod on a boat and guides a fishing line laterally outward from a gunwale of the boat so that the line resists entanglement with other fishing lines also extending from the boat. The apparatus includes a cylindrical sleeve which slides into a conventional fishing rod holder mounted in the gunwale of the boat. The sleeve is secured within the rod holder utilizing a bayonet lock to engage the cross pin of the rod holder. An annular collar is detachably connected to the sleeve so as to allow rotation of the collar about the sleeve. An elongate boom is attached to the collar so as to extend laterally outward from the gunwale of the boat. A fishing line clip is attached to the end of the boom for releasably retaining the line near the surface of the water. The line guide releases the line when a fish strikes. A shock cord extends between the boat and the end of the boom to provide additional support for the boom. The sleeve is normally inclined when installed in the rod holder so that rotation of the collar and boom about the sleeve will vary the height that the boom is held above the water. This arrangement allows the boat to turn without entangling fishing lines because the lines are positioned at different heights.

14 Claims, 2 Drawing Sheets

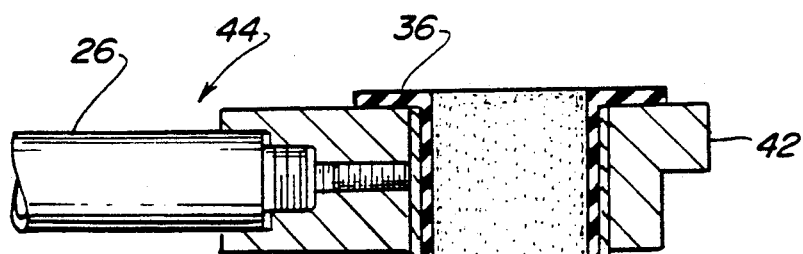
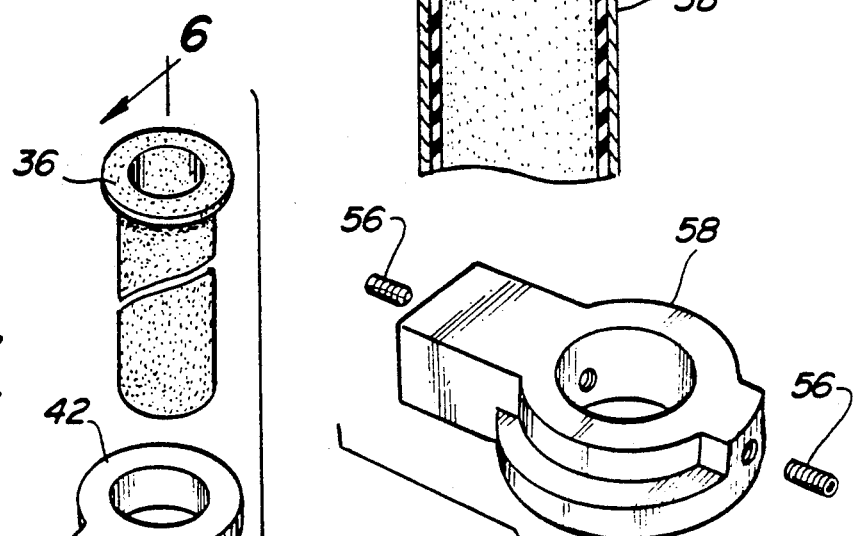
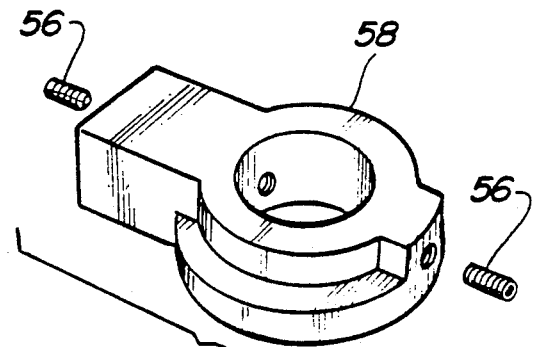
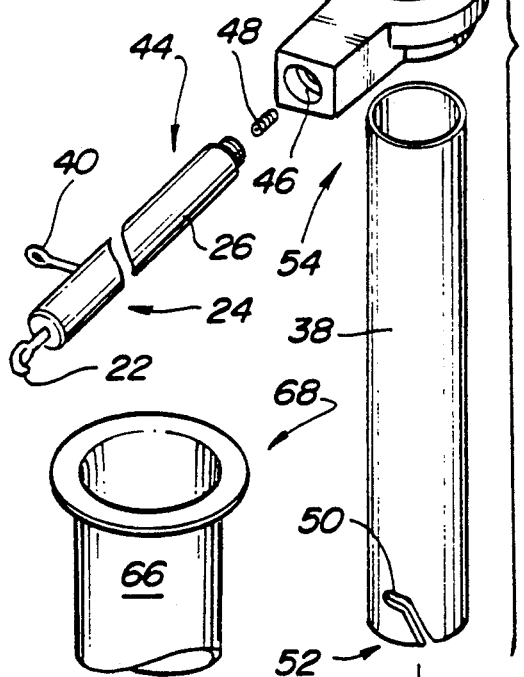
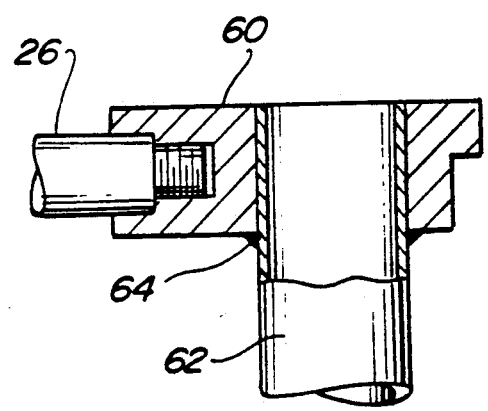

FLAT LINE BOOM

TECHNICAL FIELD

The present invention relates to a system for guiding a fishing line laterally outward from the side of a boat while also regulating the height the fishing line is held above the water.

BACKGROUND ART

Many sport fishing boats are equipped with a plurality of fishing rod holders. The holders are usually mounted within the gunwales on either side of the boat or at the stern of the boat. The fishing rod holders generally include a tube inclined at an angle from the vertical toward the stern of the boat for receiving a fishing rod. The rod holder tube is generally either a full-sized senior fishing rod holder or a shorter junior fishing rod holder. Each holder contains a cross-pin near its distal end for engaging a slot on the end of the fishing rod handle. This cross-pin is intended to prevent rotation of the pole within the tube.

A mid-size fishing boat may have several fishing rod holders. If each fishing rod holder is used, it may become difficult to maneuver the boat without entangling the fishing lines, especially when the boat is turned. It is desirable, therefore, to have a system which maintains spatial separation between the fishing lines extending from the boat. Increased separation of the fishing lines provides more maneuverability and reduces the likelihood of the fishing lines becoming entangled.

In some trolling applications, it is desirable to utilize a number of fishing lines with the bait being maintained close to the surface of the water. These fishing lines are known as flat lines. The depth of the flat lines can be controlled by regulating the angle of entry of the fishing line into the water. A steeper, more vertical, angle of entry maintains the bait at a deeper level than a shallower, more horizontal, angle of entry. Thus, it is desirable to regulate the angle of entry of the fishing line into the water so as to control the depth of the fishing bait.

When a fish strikes the bait, the active fishing rod is typically removed from the holder in the gunwale so the fish may be "played" and reeled in by someone on the boat. The force exerted on the fishing line by the fish strike may cause the line to break if it contacts any "sharp" objects which cause a sharp bend or kink in the line. It is therefore desirable to release the fishing line from any type of depth regulation device when a fish strikes the bait to avoid breaking the fishing line.

The prior art includes a number of apparatus for holding fishing rods on a fishing boat. U.S. Pat. No. 4,388,774 discloses a fishing system for supporting a plurality of fishing poles in an array on a boat. The poles are spaced laterally apart from each other a distance sufficient to prevent the fishing lines from tangling while maneuvering the boat. This system utilizes a complex mechanism to extend and retract the entire fishing rod laterally outward from the side of the boat. Furthermore, the system must be mounted to the boat requiring special mounting brackets. The system also does not provide integral means for regulating the depth of the fishing bait in the water. Instead, the system utilizes a separate down-rigger apparatus to perform that function.

A device for holding or storing a plurality of fishing rods is disclosed in U.S. Pat. No. 4,485,579. That device utilizes conventional fishing rod holders disposed within the gunwales of a fishing boat. This device is utilized to store or hold fishing rods which are not in use. Thus, the device keeps the fishing rods and lines from becoming entangled with an active fishing rod while a fish is being landed.

Another device which prevents entanglement of fishing lines is disclosed in U.S. Pat. No. 4,876,980. This device also utilizes standard fishing rod holders normally positioned in the gunwales of the fishing boat. This device displaces the entire fishing rod laterally outward from the side of the boat and does not provide means for regulating the height of the fishing line above the water.

SUMMARY OF THE INVENTION

It is, therefore, an object of the present invention to provide a system for maintaining vertical and horizontal spatial separation among fishing lines extending from a fishing boat.

It is also an object of the present invention to utilize conventional fishing rod holders typically mounted in the gunwales of a fishing boat.

It is an additional object of the present invention to provide a portable and inexpensive system which regulates the height of the fishing rod and controls the angle of entry of the fishing line into the water.

Another object of the present invention is to provide a flat line boom system which uses available line release mechanisms to minimize the chance of breaking the fishing line.

In carrying out the above object and other objects and features of the present invention, a flat line boom system is provided which couples with a conventional fishing rod holder on a boat. The flat line boom system guides a fishing line laterally outward from a side of the boat so that the line resists entanglement with other fishing lines also extending from the boat.

The flat line boom system includes a cylindrical sleeve which slides into the conventional fishing rod holder mounted in the gunwale of the boat. The sleeve is secured within the rod holder utilizing a bayonet lock to engage a cross-pin of the rod holder. An annular collar is detachably connected to the sleeve so as to allow rotation of the collar about the sleeve.

The flat line boom is attached to the collar so as to extend laterally outward from the side of the boat. A fishing line clip is attached to the end of the boom for releasably retaining the line near the surface of the water. The line clip releases the line when a fish strikes. A shock cord extends between the boat and the end of the boom to provide additional support for the boom. Since the sleeve is normally inclined when installed in the rod holder, rotation of the collar and boom about the sleeve can vary the height that the boom is held above the water. This arrangement reduces the likelihood of the fishing lines becoming entangled while the boat is turning since the fishing lines may be positioned at different heights.

The above objects and other objects, features, and advantages of the present invention will be readily appreciated by one of ordinary skill in the art from the following detailed description of the best mode for carrying out the invention when taken in connection with the accompanying drawings.

BRIEF DESCRIPTION OF THE DRAWINGS

FIG. 3 is an assembly view of a flat line boom system according to the present invention;

FIG. 4 illustrates an alternative embodiment of an annular collar for use with a flat line boom system according to the present invention;

FIG. 5 illustrates another alternative embodiment of a flat line boom system according to the present invention; and FIG. 6 is a cross-sectional view taken along line 6—6 of FIG. 3 illustrating a flat line boom system according to the present invention.

FIG. 7 illustrates an alternative embodiment of an elongate sleeve for use with a flat line boom system according to the present invention.

BEST MODE FOR CARRYING OUT THE INVENTION

Figures 1, 2:
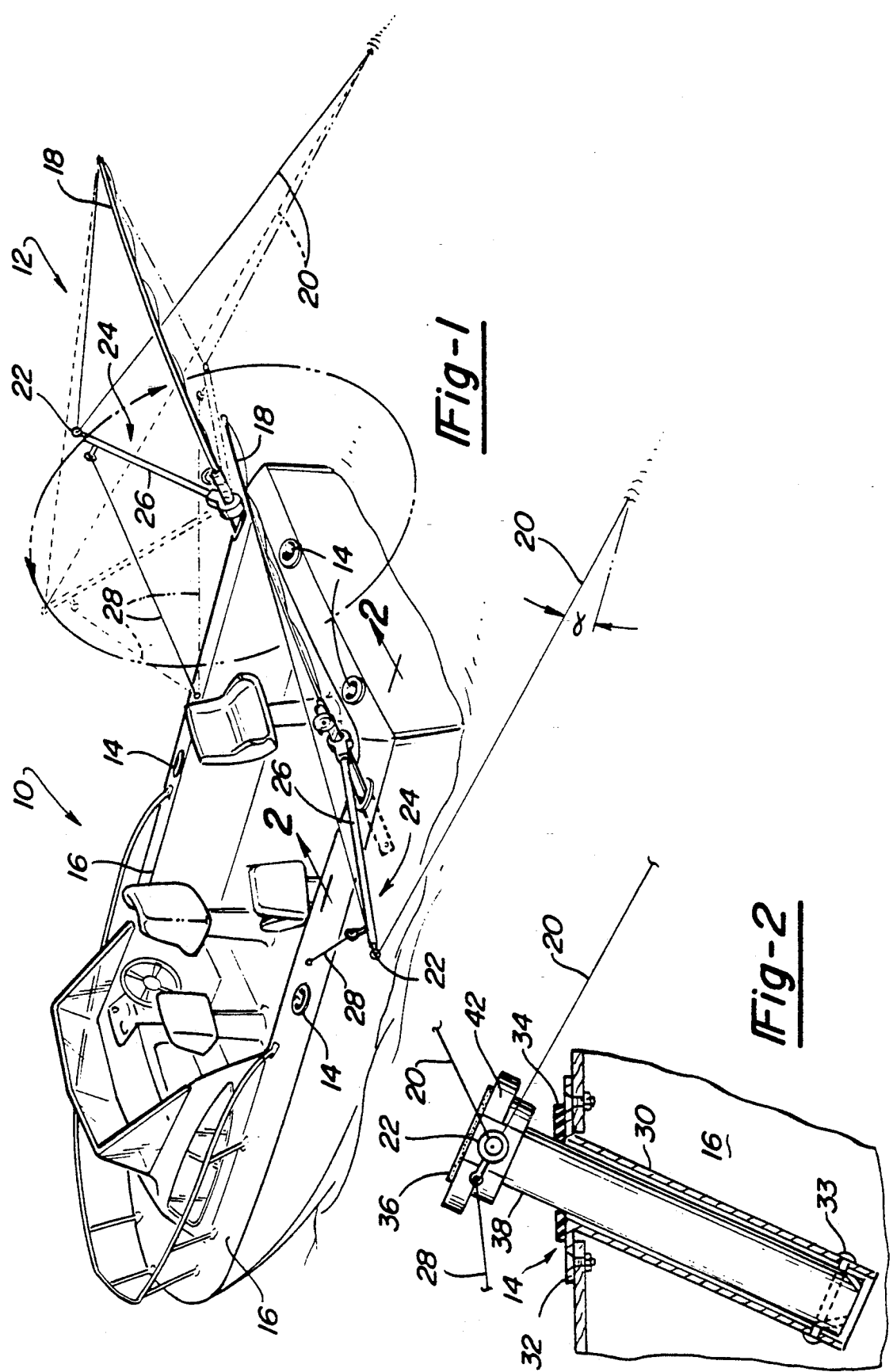
FIG. 1 is a perspective view of a fishing boat utilizing two of the flat line booms according to the present invention.
FIG. 2 is a cross-sectional view taken along line 2—2 of FIG. 1 illustrating a preferred embodiment of a flat line boom system disposed within a conventional fishing rod holder according to the present invention.

Referring now to FIG. 1, a perspective view of a fishing boat, indicated generally by reference numeral 10, is shown. The fishing boat 10 is shown utilizing two flat line boom systems 12 according to the present invention. A typical fishing boat 10 is equipped with six conventional fishing rod holders 14. Each gunwale 16 of the fishing boat 10 usually contains two of the conventional rod holders 14 with an additional two rod holders 14 mounted in the stern. Of course, the design of the flat line boom system 12 allows the fishing boat 10 to use a flat line boom system 12 for each of the fishing rod holders 14. The fishing boat 10 illustrates the use of only two flat line boom systems 12 simply for the sake of clarity.

Still referring to FIG. 1, each flat line boom system 12 is received within a fishing rod holder 14. As shown, the fishing rod holder 14 is disposed within the gunwale 16 and inclined at some angle relative to the vertical toward the stern of the boat. Typically, this angle of incline is approximately 30°. A fishing rod 18 is then received within the flat line boom system 12. Each fishing rod 18 has a fishing line 20 which extends along the fishing rod 18 and travels through a line clip 22 disposed on the distal end 24 of the boom 26. The fishing line 20 then descends into the water defining an entry angle α between the fishing line 20 and the surface of the water.

As also illustrated in FIG. 1, a shock cord 28 extends between the distal end 24 of boom 26 and the gunwale 16 of fishing boat 10. The shock cord 28 provides additional support to the boom 26 to help resist bending the boom when a fish strikes fishing line 20. The line clip 22, best illustrated in FIG. 3, is operative to release fishing line 20 when a fish strikes. This reduces the likelihood of the line becoming kinked and breaking due to a sharp bend around the line clip 22. The line clip also limits the average bending force exerted on the boom 26 by fishing line 20 as explained in greater detail below.

As further illustrated in FIG. 1, the flat line boom system 12 is rotatable within the conventional fishing rod holders 14 from a deployed position to a set-up position. This allows easy access to the distal end 24 of boom 26 from within the fishing boat 10 for threading the fishing line 20 through the line clip 22. When in the deployed position, the flat line boom system 12 is locked within fishing rod holder 14, as explained in greater detail below. In a preferred embodiment, the deployed position of the flat line boom 26 is adjusted to vary the height of the distal end 24 above the water, as is also explained below.

Referring now to FIG. 2, a cross-sectional view taken along line 2—2 of FIG. 1 illustrates a preferred embodiment of the present invention disposed within a conventional fishing rod holder. The conventional fishing rod holder 14 is mounted within gunwale 16 of fishing boat 10. Rod holder 14 comprises an elongate tube 30 with an annular lip 32 which is secured to gunwale 16. Lip 32 is inclined at an angle, usually 30°, relative to the longitudinal axis of elongate tube 30. A cross-pin 33 extends across the bottom end of elongate tube 30 for securing a fishing pole as explained in greater detail below.

As also shown in FIG. 2, rod holder 14 may include a resilient insert 34 for protecting the handle of an installed fishing rod from inelastic deformation and also to enhance the gripping capability of rod holder 14. Likewise, a similar holding insert 36 may be disposed within elongate sleeve 38 for improving the gripping ability of flat line boom system 12 and to adapt the system for use with fishing rods having various handle diameters. Inserts having different wall thicknesses may be used to accommodate a wider range of variation among fishing rod handle diameters than a single insert is capable of accommodating. The inserts may be made of any resilient material such as a polymeric elastomer or rubber.

Referring now to FIG. 3, a perspective view of a preferred embodiment of a flat line boom system according to the present invention is shown. The line clip 22 is mounted to the distal end 24 of the flat line boom 26. The line clip 22 guides a fishing line laterally outward from the side of the fishing boat 10 while trolling. The line clip 22 is operative to release the fishing line when a predetermined force, such as a fish strike, is exerted upon the fishing line. Any of a variety of line clips which are commercially available may be used to accomplish this result, as is well known in the art. In fact, even a properly twisted rubber band may be utilized to perform this function.

As also shown in FIG. 3, a coupler 40, such as an eyebolt, is mounted to the distal end 24 of the flat line boom 26. The coupler 40 functions to secure a shock cord 28 to the flat line boom 26. The shock cord 28 distributes the bending force exerted by a fish strike on boom 26 so that the boom 26 resists any inelastic displacement. The flat line boom 26 is disengageably connected to an annular collar 42. In a preferred embodiment of the present invention, the proximate end 44 of boom 26 is threaded for engagement with a radially extending hole 46 in collar 42. Radially extending hole 46 may be counterbored into collar 32 to provide added support to boom 26, as best illustrated in FIG. 6.

As further shown in FIG. 3, a bayonet lock 50 is disposed near the distal end 52 of sleeve 38. The bayonet lock 50 comprises a pair of slots which extend from the distal end 52 toward the proximate end 54 of sleeve 38 in a generally helical path, much like a screw thread. The slots are positioned across a diameter of sleeve 38 to allow engagement with a cross-pin 33 disposed within fishing rod holder 14. In operation, the flat line boom system 12 slides into fishing rod holder 14 and is rotated until bayonet lock 50 engages cross-pin 33. Once engaged, further rotation draws flat line boom system 12 into fishing rod holder 14, thereby securely locking system 12 into place. Thus, the length of sleeve 38 should be sufficient to allow the bayonet lock 50 to properly engage cross-pin 33. Typically, a length of sixteen inches is sufficient, however, there is a wide variety of commercially available fishing rod holders and a longer or shorter length may be necessary. For example, a junior rod holder may require a length of only twelve inches whereas a senior rod holder may require a length of eighteen inches for proper engagement. The design of the flat line boom system 12 will easily accommodate various lengths of elongate sleeve 38 and thus be able to adapt to most commercially available fishing rod holders.

Still referring to FIG. 3, the collar 42 is secured about an elongate sleeve 38. In an alternative embodiment illustrated in FIG. 7, an elongate sleeve 68 has a flange at proximate end 66 to further enhance assembly of the system. Returning now to FIG. 3, in a preferred embodiment, set-screw 48 is utilized to secure collar 42 about sleeve 38. Thus, to modify the height of boom 26 when in the deployed position, set-screw 48 is released to allow rotation of collar 42 (and therefore boom 26) about sleeve 38. The set-screw 48 is then tightened to prevent unwanted rotation when the flat line boom system 12 is in use.

In one alternative embodiment, illustrated in FIG. 4, a plurality of set screws 56 is utilized to provide added strength and durability to a flat line boom system while still allowing selective rotation of a collar 58. Of course, the exact placement of the set-screws around the circumference of collar 58 is not important.

In another alternative embodiment, illustrated in FIG. 5, a collar 60 is fixedly secured to a sleeve 62 by welds 64 thereby eliminating rotation of collar 60 about sleeve 62. In this alternative embodiment, a number of differently oriented collar/sleeve assemblies should be utilized to provide the needed separation among fishing lines.

Referring now to FIG. 6, a cross-sectional view taken along line 6—6 of FIG. 3 illustrates a flat line boom system according to the present invention. The annular collar 42 is secured to the proximate end 54 of elongate sleeve 38 utilizing set-screw 48. As shown, radially extending hole 46 is threaded to accommodate set screw 48 for engaging sleeve 38. Hole 46 is also threaded to accommodate the complementary threads disposed on the proximate end 44 of boom 26. The largest diameter of hole 46 is designed to accommodate the outer diameter of boom 26 thereby providing additional support to boom 26.

It is understood, of course, that while the form of the invention herein shown and described constitutes the preferred embodiment of the invention, it is not intended to illustrate all possible forms thereof. It will also be understood that the words used are descriptive rather than limiting, and that various changes may be made without departing from the spirit and scope of the invention disclosed.

What is claimed is:

1. A flat line boom apparatus for holding a fishing rod on a boat and for guiding a first fishing line laterally outward from a gunwale of the boat so that the first line resists entanglement with a second fishing line, the apparatus comprising:

an elongate sleeve having proximate and distal ends, the sleeve also having an outer diameter slidingly engageable with a conventional fishing rod holder mounted on the boat and an inner diameter for receiving the fishing rod;

an annular collar secured about the proximate end of the sleeve;

an elongate boom having proximate and distal ends, the proximate end of the boom disengageably connected to the collar; and a line clip for guiding the first fishing line laterally outward from the gunwale of the boat, the line clip being mounted proximate the distal end of the boom.

2. The apparatus of claim 1 wherein the annular collar is detachably secured so as to allow selective rotation of the collar about the sleeve.

3. The apparatus of claim 2 wherein the sleeve is received by the conventional fishing rod holder which is inclined at an angle from the vertical and wherein rotation of the collar varies the vertical distance of the distal end of the boom relative to the proximate end of the boom.

4. The apparatus of claim 1 wherein the annular collar is fixedly secured to the sleeve so as to prevent rotation of the collar about the sleeve.

5. The apparatus of claim 1 wherein the conventional fishing rod holder includes a cross-pin extending across a diameter of the holder and wherein the sleeve includes a pair of generally helical diametrical slots disposed at the distal end of the sleeve for rotatably connecting the sleeve to the cross pin.

6. The apparatus of claim 1 further comprising a shock cord for stabilizing the boom so as to distribute a force applied to the distal end of the boom, the force being distributed between the shock cord and the boom, the shock cord extending between the distal end of the boom and the gunwale of the boat.

7. The apparatus of claim 6 further comprising:

a coupler mounted to the distal end of the boom for releasably securing the shock cord to the boom; and a connector mounted to the gunwale of the boat for releasably securing the shock cord to the boat.

8. The apparatus of claim 1 wherein the line clip is operative to release the first fishing line when a predetermined force is exerted upon the first fishing line.

9. The apparatus of claim further comprising a resilient cylindraceous insert disposed within the sleeve for resisting inelastic deformation of the fishing rod.

10. A flat line boom apparatus for holding a fishing rod on a boat and for guiding a first fishing line laterally outward from a gunwale of the boat so that the first line resists entanglement with a second fishing line, the apparatus comprising:

an elongate sleeve having proximate and distal ends, the sleeve also having an outer diameter slidingly engageable with a conventional fishing rod holder mounted on the boat and an inner diameter for receiving the fishing rod;

an annular collar having at least one radially disposed fastener for detachably securing the collar about the proximate end of the sleeve so as to allow selective rotation of the collar about the sleeve, the collar also having an outer diameter with a radially disposed hole;

an elongate boom having proximate and distal ends, the proximate end of the boom being selectively engageable with the radially disposed hole of the collar; and a line clip for guiding the first fishing line laterally outward from the gunwale of the boat, the line clip being mounted to the distal end of the boom and operative to release the line when a predetermined force is applied to the line.

11. The apparatus of claim 10 further comprising a shock cord connected to the distal end of the boom and also connected to the gunwale of the boat for providing additional support to the boom.

12. The apparatus of claim 10 wherein the radially disposed hole and the proximate end of the boom are complementarily threaded.

13. The apparatus of claim 10 wherein the conventional fishing rod holder includes a cross-pin extending across a diameter of the holder and wherein the sleeve includes a pair of generally helical diametrical slots disposed at the distal end of the sleeve for rotatably connecting the sleeve to the cross pin.

14. The apparatus of claim 10 further comprising a resilient cylindraceous insert disposed within the sleeve for resisting inelastic deformation of the fishing rod.

* * * * *